United States Patent Office 3,529,840
Patented Sept. 22, 1970

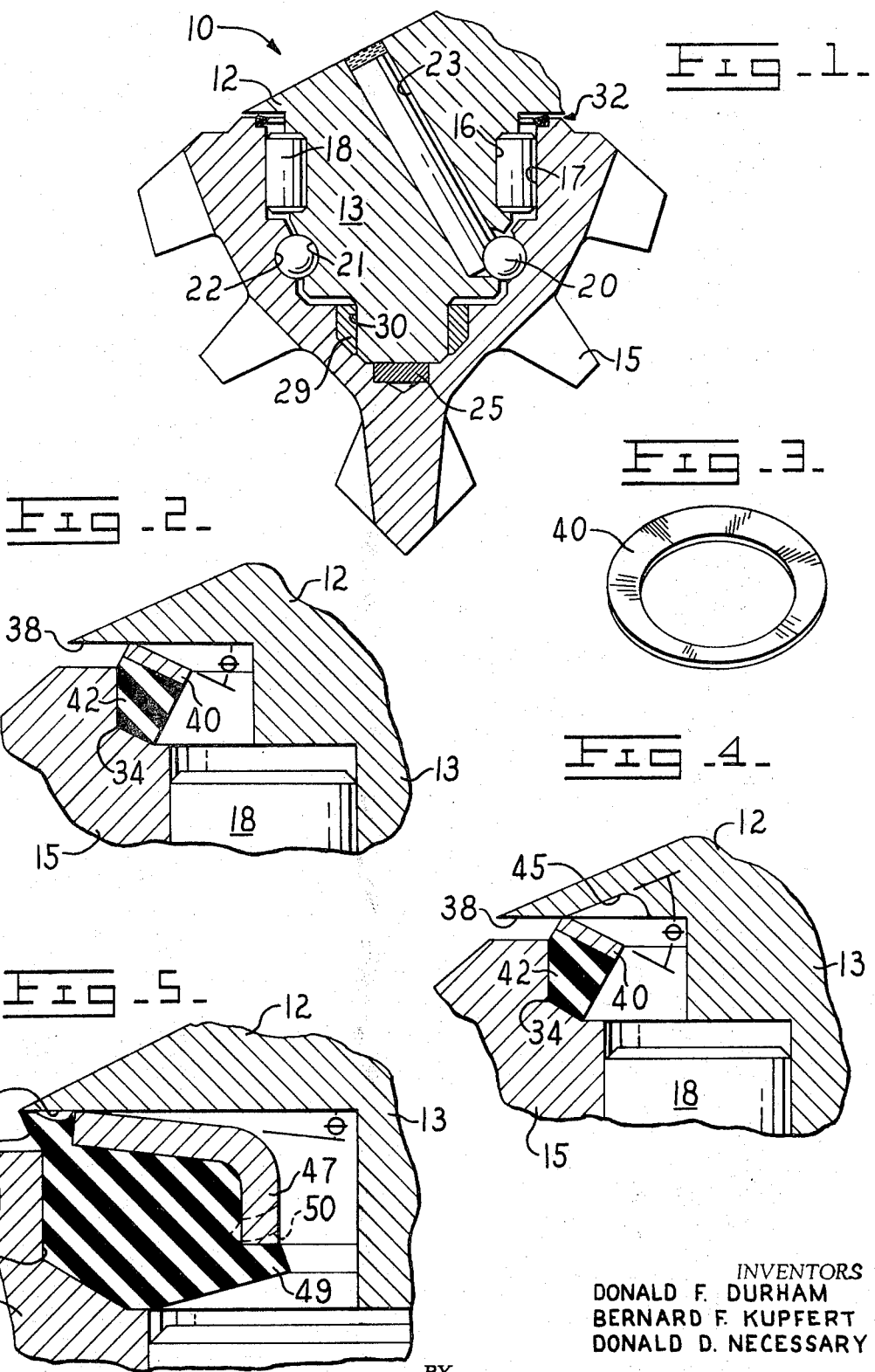

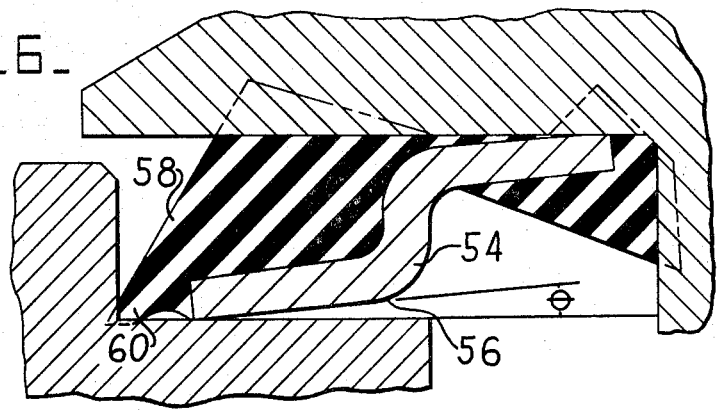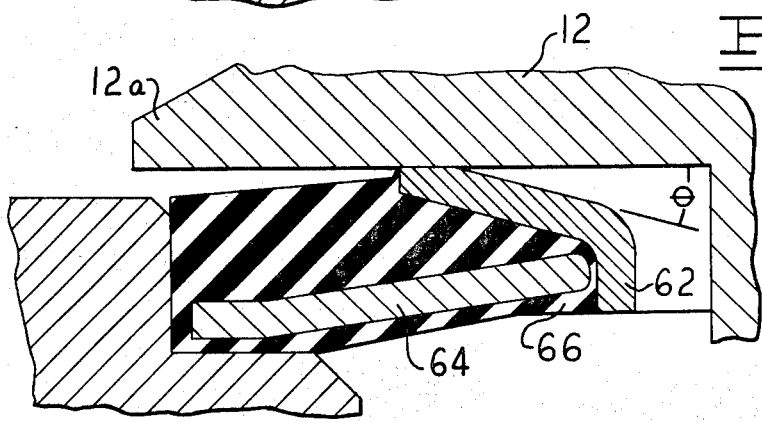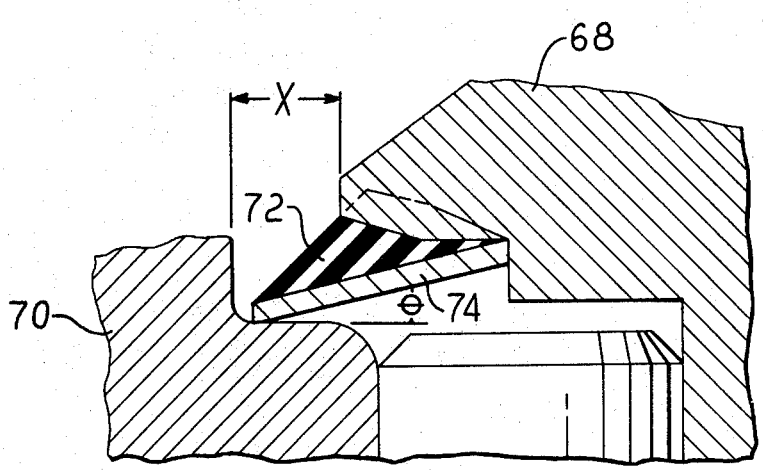

3,529,840
BEARING SEAL
Donald F. Durham and Bernard F. Kupfert, Peoria, and Donald D. Necessary, Morton, Ill., assignors to Caterpillar Tractor Co., Peoria, Ill., a corporation of California
Continuation of application Ser. No. 598,396, Dec. 1, 1966. This application Oct. 23, 1969, Ser. No. 868,942
Int. Cl. F16j 15/38
U.S. Cl. 277—92          5 Claims

---

ABSTRACT OF THE DISCLOSURE

An annular seal assembly comprises a thin, hardened, metal frusto-conical, flexible spring washer seal for performing the dual function of a combined seal and thrust means and has a resilient backing member engaged therewith for compressably forcing the radially outermost portion of the thin metal seal into face-to-face engagement with an annular metal surface.

---

This application is a continuation of application Ser. No. 598,396, filed on Dec. 1, 1966, and now abandoned.

This invention relates to a lubricant seal between two relatively rotatable parts and is of particular utility in retaining lubricant within a bearing, and excluding foreign material therefrom, where there is a combination of relative axial, radial and wobbling movement. The invention is more specifically directed to a seal assembly comprising a thin metal face seal in combination with a relatively large resilient backing member.

The invention is of particular utility in earth-boring drill bits of the rolling cutter type and is described herein as embodied in such a structure. It is to be understood, however, that the invention is not confined to such a particular structure but may be used in any environment wherein its superiority may be exploited. Bits of this type are commonly provided with a body having a plurality of downwardly extending legs, each leg having a trunnion formed integrally therewith and extending inwardly. A cutter is rotatably mounted on each of the trunnions. Anti-friction bearings are interposed between the trunnions and cutters to assume the loads imposed thereon in normal drilling operations.

Since rock bits of this general type operate in a stream of mud delivered through the interior of the drill pipe to which the bit is attached, there exists a problem of preventing the mud fluid from entering the bearings which support the cutters on their respective trunnions. The entrance of the mud fluid into the bearing assemblies materially shortens the service life of the bit by causing premature wear and failure of the bearings. Any increase of the service life of the bit is a very important matter because it postpones the operation of "making a round trip" to lift the bit to the surface, unjointing the drill pipe sections one by one in order to install a new bit on the end of the drill string. The bit is returned to the bottom of the hole by re-connecting the drill pipe sections end to end as the drill string and bit are lowered into the hole.

The bearings are filled with a lubricant at the time of assembly, but, since these bits are usually run in an ambient of violently agitated flushing fluid which is either initially mud-laden or becomes contaminated with cuttings, the lubricant is quickly contaminated and eventually is entirely displaced by the flushing fluid and abrasive materials contained therein. This leads to rapid deterioration of the bearing structure, which in turn decreases the effectiveness of the bit and its useful life.

Accordingly, it is the principle object of this invention to provide a novel of sealing device to prevent escape of lubricant from the bearings which support the cutters on the trunnions of a rock bit.

Another object of the invention to provide a seal assembly which is effective to exclude mud and foreign matter from the cutter bearings as well as to retain lubricant within them.

A further object of the invention is to provide a bearing lubricant seal which will maintain a seal between the relatively rotating parts even though the parts are subject to a composite movement of one part relative to the other.

Still another object of the invention is to provide between relatively rotating parts a seal assembly which is so constructed and arranged that it will follow all relative movements between the parts and thereby retain lubricant within the bearing and prevent entrance of a contaminant thereto.

Other objects and advantages of the invention will be apparent from the following description and accompanying drawing.

In the drawing:
FIG. 1 is a sectional view through one of the cutter assemblies of a rock drill bit embodying the invention;
FIG. 2 is an enlarged detail showing the lubricant seal and its relationship to the cutter and trunnion to which it forms a seal;
FIG. 3 is a perspective of one of the components of the seal shown in FIG. 2;
FIG. 4 is an enlarged detail of a modified embodiment of the invention;
FIG. 5 is an enlarged detail of another modified embodiment of the invention; and
FIGS. 6, 7 and 8 are enlarged detailed showings of still further embodiments of the invention.

As shown in FIG. 1 of the drawing, a rock bit, generally designated 10, includes leg members 12, only one of which is shown. A trunnion 13 is formed integrally on the leg and a cutter 15 having an outer surface provided with teeth is rotatably mounted thereon.

The trunnion 13 is provided with a cylindrical surface 16 forming an inner race and the cutter 15 is provided with a cylindrical surface 17 providing an outer raceway. Roller bearing elements 18 are positioned between the trunnion 13 and the cutter 15 and each roller element contacts the inner race 16 and the outer race 17. A ball-bearing assembly is also provided between the trunnion 13 and the cutter 15 and as shown in the drawing, this includes a series of balls 20 positioned in races 21 and 22 provided on the trunnion and cutter respectively. A passage 23 is provided in the leg 12 and trunnion 13 to permit introduction of balls 20 into the space between the raceways 21 and 22. The passage 23 may be suitably closed by a plug and/or weld metal.

In addition to the roller bearings 18 and the ball-bearings 20 there is provided a thrust bearing assembly which includes a hardened radial plate 25 provided in the cutter 15. Also a cylindrical sleeve 29 mounted in the cutter 15 engages a hardened cylindrical surface 30 provided on the trunnion.

Suitable lubricant is placed between the trunnion 13 and the cutter 15 at the time of assembly of the parts and in accordance with this invention a novel form of sealing assembly 32 is provided to confine the lubricant and to prevent entry of mud or foreign matter.

Referring now to FIG. 2, it will be observed that the seal assembly 32 interposed between a counterbore 34 on the base of the uutter 15 and a radially inwardly facing, hardened shoulder 38 on the bit leg 12. The seal assembly 32 comprises an annular thin metal sealing ring 40 and a resilient backing member 42.

Earth-boring bits are subjected to extreme stresses from the static load or weight of the drill string, etc., which is commonly of the order of 40,000 to 70,000 pounds. Resulting stresses are augmented by impact stresses of high amplitude as bits often run "rough" especially when drilling hard formations. Such extreme conditions cause complex movement of the cutter 15 relative to the trunnion 13, and such movement is amplified as wear takes place. One component of movement is axially of the trunnion. At the same time there is a wobbling movement of the cutter relative to the shaft. Hence, the seal assembly 32 must be so constructed and arranged that it will follow every movement of the confronting surfaces of the bit leg and the cutter.

The metal seal ring 40 is of special construction to provide a positive seal at all times and under all circumstances between the shoulder surface 38 and the surfaces of the counterbore 34. As shown in FIG. 3, the metal seal 40 comprises a combined seal and thrust means in the form of a frusto-conical spring washer generally known as a Belleville spring. The metal seal 40 is very thin having a thickness of the order of 0.022 inch. Thus there is provided a metal-to-metal contact face seal which, due to the spring action and flexibility of the thin metal section, allows the seal to readily conform to a mating surface. While not shown in the drawing, it may be desirable in some applications to use a combination of two seal assemblies with the metal seals 40 in face-to-face abutment.

The large resilient backing member 42 is preferably bonded to the thin metal face seal although the frusto-conical shape of the upper surface of the backing member insures that the metal seal will not slip radially during rotation. In assembly, the resilient backing member is compressed into the counterbore 34 to insure positive sealing between the metal face ring 40 and the shoulder 38. It will also be observed that the backing 42 completely fills the counterbore 34 preventing dirt, sand and other foreign materials from entering the area of the bearings and also maintaining the lubricant therein. The resilient backing material 42 must be of such a nature as to be impervious to the adjacent liquids and must also be chemically inert to such liquids as well as capable of maintaining an effective seal with the surface engaged by it. Such a material is available, for example, in various of the oil resistant synthetic rubbers and plastics.

Before discussing the various embodiments of the seal assembly as shown in the remaining figures, it should be noted that they all have several features in common. Thus, as shown in all embodiments, an angle θ is denoted. This angle represents the optimum relationship between the thin metal seal face and the contact surface from the standpoint of seal face lubrication and uniform wearing away of the metal seal. If the angle θ is too small, i.e. if the thin metal seal is placed in a near flat face-to-face engaging condition with the bearing surface, less lubricant is available to the sealing area which results in frictional drag and a damaging heat build-up. Conversely, if the angle θ is too large, the surface contacted by the thin metal seal (such as the shoulder 38) becomes grooved or scored and the effectiveness of the seal is greatly impaired. From an economical standpoint the optimum angle θ is that which will make full use of the metal comprising the face seal by continually providing a new metal sealing surface on the member 40 as the metal wears away in a radially inwardly direction until eventually only the backing member 42 remains. Tests have shown that the optimum value for the angle θ is 1–12°.

Another common feature of all seal embodiments disclosed herein relates to the preferred material of which the face seal (40 in FIGS. 1 and 2) is constructed. In all embodiments disclosed, the seal will be required to give long life under severe operating conditions including performing satisfactorily after long periods of inactivity where corrosion can become an acute problem. It is essential for proper performance that the seal face at all times follow the backup section without slip. Consequently, a provision for avoiding corrosion bond between the metal wafer face and the contact surface must be made. While other suitable non-corrosive metal materials are no doubt satisfactory, it is preferable to use a carburizing grade stainless steel carburized throughout and hardened to a minimum hardness of Rockwell C 60.

In FIG. 4 there is shown a slightly modified embodiment from that shown in FIG. 2. It has been observed that an excellent seal results from grinding a concave surface 45 on the shoulder 38 having an angle equal to the angle which the metal seal face 40 makes with the shoulder surface 38. Tests appear to indicate that an embodiment such as shown in FIG. 4 provides a superior mating surface for the seal face 40 especially where shoulder surface 38 is of quite different material and/or hardness and is consequently more prone to grooving or scoring which leads to leakage. Though the concave surface 45 is not specifically shown in any of the seal embodiments to be discussed infra with respect to FIGS. 5–8, it is to be understood that such a surface could be provided where space permits.

The embodiment shown in FIG. 5 is basically similar to those previously disclosed, however, in order to further insure against slippage between the metal face seal 47 and its backing 49 a mechanical lock in the form of a tab of toothed member 50 is embedded into the resilient backing. In addition, the backing member 49 is provided with a protruding lip portion 52 located radially outwardly of the metal face seal 47. The lip 52 provides initial sealing and prevents the entrance of foreign materials from the metal sealing surfaces until such time as they wear in or seat.

The embodiment shown in FIG. 6 illustrates a form of thin metal face seal which is adapted to be used in a rock bit having a wide radial gap between the relatively rotating parts. This embodiment is provided with an S-shaped metal mid-portion 54 which is integral with the thin metal face seal 56. As shown, the S-shaped midportion 54 is backed by resilient material 58 in such a manner to provide concentrated loads for optimum sealing as indicated by the dashed lines which represent an unloaded condition. The protruding lip 60 is to give initial sealing until the seal has had an opportunity to properly seat.

The embodiment of FIG. 7 represents another seal construction for bridging wide radial gaps between relatively rotating parts, and in the case of rock bits, moves the sealing area away from the thin unprotected section of the leg 12 which may be subjected to severe deforming loads. Thus, as shown, the thin metal face seal 62 forms a seal at a location radially inwardly of the unprotected section 12a of the leg 12. Moreover, in order to lend additional support for bridging the relatively wide radial gap between the rotating parts, an annular shaped metal reinforcing member 64 is embedded within the resilient backing material 66.

FIG. 8 illustrates still another embodiment which is especially suitable for rock bit configurations wherein there exists a large unprotected gap, denoted at X, between the leg 68 and cutter 70. It will be readily understood that the construction shown in FIG. 8 permits foreign materials and fluids to cooperate with the resilient backing member 72 in an additive manner to press the thin metal face seal 74 against its mating face.

We claim:

1. In a machine having a first metal member relatively rotatably mounted with respect to a second metal member to define therebetween a gap; said gap being bounded by a first shoulder portion on said first member and a second shoulder portion on said second member, each of said first and second shoulder portions comprising both a generally radially extending annular surface and a generally axially extending annular surface; an annular seal assembly comprising a thin, hardened, metal, frusto-conical, flexible spring washer seal for performing the dual function of a combined seal and thrust means, said metal seal having a thickness of approximately 0.022 inch and further having engaged therewith a relatively large resilient backing member compressably fitted into one of said shoulder portions and including a substantial portion interposed between said shoulder portion and the radially outermost portion of said thin metal seal for forcing said outermost portion into face-to-face sealing contact with the radially extending annular surface of the other of said shoulder portions whereby wear of said seal is confined to said radially outermost portion.

2. The seal assembly of claim 1 wherein said thin metal seal member normally contacts said radially extending annular surface at an angle of 2–13°.

3. The seal assembly of claim 2 wherein one-half of said contact angle is provided by a concave surface formed on said radially extending annular surface.

4. The seal assembly of claim 2 wherein said thin metal seal member is stainless steel, carburized throughout to a minimum hardness of Rockwell C 60.

5. The seal assembly of claim 2 wherein said resilient backing member is provided with a protruding lip portion for sealingly engaging said radially extending annular surface at a location radially outwardly of said thin metal seal.

References Cited

UNITED STATES PATENTS

| | | |
|---|---|---|
| 2,202,944 | 6/1940 | Boyd. |
| 2,341,900 | 2/1944 | Boden. |
| 2,712,460 | 7/1955 | Saywell. |
| 2,797,067 | 6/1957 | Fisher. |
| 3,269,738 | 8/1966 | Baumler et al. |
| 3,313,552 | 4/1967 | McElya et al. |
| 3,370,895 | 2/1968 | Cason. |
| 3,480,338 | 11/1969 | Durham et al. |

FOREIGN PATENTS

| | | |
|---|---|---|
| 232,330 | 7/1963 | Austria. |
| 891,849 | 3/1962 | Great Britain. |

LAVERNE D. GEIGER, Primary Examiner

J. S. MEDNICK, Assistant Examiner

U.S. Cl. X.R.

277—95, 170, 235